US007409681B2

(12) United States Patent
Graham et al.

(10) Patent No.: US 7,409,681 B2
(45) Date of Patent: Aug. 5, 2008

(54) OBTAINING TRANSLATION OF GENERIC CODE REPRESENTATION

(75) Inventors: John Graham, San Diego, CA (US); Alasdair Rawsthorne, Stockport (GB); Jason Souloglou, Manchester (GB)

(73) Assignee: Transitive Limited, Manchester (GB)

( * ) Notice: Subject to any disclaimer, the term of this patent is extended or adjusted under 35 U.S.C. 154(b) by 291 days.

(21) Appl. No.: 10/232,780

(22) Filed: Aug. 28, 2002

(65) Prior Publication Data

US 2003/0061602 A1    Mar. 27, 2003

(30) Foreign Application Priority Data

Aug. 31, 2001   (GB)  ................................ 0121064.0

(51) Int. Cl.
*G06F 9/45*         (2006.01)

(52) U.S. Cl. ........................................ 717/146; 717/147

(58) Field of Classification Search .................. 717/162, 717/170, 146, 148, 138, 136, 147; 713/194; 707/102; 719/318
See application file for complete search history.

(56) References Cited

U.S. PATENT DOCUMENTS

| | | | |
|---|---|---|---|
| 5,313,635 A | 5/1994 | Ishizuka et al. | |
| 5,925,123 A | 7/1999 | Tremblay et al. | |
| 5,937,193 A | 8/1999 | Evoy | |
| 5,956,513 A | 9/1999 | McLain, Jr. | |
| 6,058,482 A | 5/2000 | Liu | 713/201 |
| 6,091,897 A * | 7/2000 | Yates et al. | 717/138 |
| 6,295,638 B1 | 9/2001 | Brown et al. | 717/148 |
| 6,324,685 B1 * | 11/2001 | Balassanian | 717/118 |
| 6,370,687 B1 * | 4/2002 | Shimura | 717/146 |
| 6,412,021 B1 * | 6/2002 | Nguyen et al. | 719/318 |
| 6,442,558 B1 * | 8/2002 | Brown et al. | 707/102 |
| 6,484,313 B1 * | 11/2002 | Trowbridge et al. | 717/146 |
| 6,631,515 B1 * | 10/2003 | Berstis | 717/140 |
| 6,654,954 B1 * | 11/2003 | Hicks | 717/162 |
| 6,665,642 B2 * | 12/2003 | Kanevsky et al. | 704/260 |

(Continued)

FOREIGN PATENT DOCUMENTS

EP           0 778 520         6/1997

(Continued)

OTHER PUBLICATIONS

Search Report issued for GB 0219099.9 dated Mar. 20, 2003.

(Continued)

*Primary Examiner*—Tuan Q. Dam
*Assistant Examiner*—Thuy Dao
(74) *Attorney, Agent, or Firm*—Wilmer Cutler Pickering Hale and Dorr LLP (57) ABSTRACT

An execution apparatus (10) such as a user PC identifies that translation of generic code representation is required (e.g. Java bytecode included or referenced as part of a web page downloaded from a content provider (20)), and requests a translation of the generic code representation from a remote translation apparatus (30), i.e. a translation server. A translated native code version of the generic code representation specific to a particular execution environment (10) is identified and sent from the translation apparatus (30) immediately ready for native execution on the execution apparatus (10) at full native speed. This avoids perceived slow start-up and unresponsiveness associated with interpretation or compilation of generic code representation at the execution apparatus (10).

27 Claims, 3 Drawing Sheets

U.S. PATENT DOCUMENTS

| | | | |
|---|---|---|---|
| 6,668,325 B1 * | 12/2003 | Collberg et al. | 713/194 |
| 6,826,750 B1 * | 11/2004 | Curtis et al. | 717/170 |
| 2002/0184618 A1 * | 12/2002 | Bala et al. | 717/148 |

FOREIGN PATENT DOCUMENTS

| | | |
|---|---|---|
| EP | 0 924 611 | 6/1999 |
| EP | 1 072 974 | 1/2001 |
| EP | 1 197 847 | 4/2002 |
| GB | 2 382 426 | 5/2003 |
| WO | WO-97/27537 | 7/1997 |
| WO | WO-01/79999 | 10/2001 |

OTHER PUBLICATIONS

International Search Report issued for PCT/GB02/03802, dated Aug. 15, 2003.

* cited by examiner

Fig 3
(Amended)

US 7,409,681 B2

OBTAINING TRANSLATION OF GENERIC CODE REPRESENTATION

The present invention relates to a method and apparatus for obtaining translation of generic code representation.

Generic code representation allows program code to be written and distributed conveniently across many different types of computing platform. One well known example of generic code representation is Java bytecode. (Java is a trade mark of Sun Microsystems, Inc.) A programming language such as Java allows source code to be compiled into generic code representation which is independent of the intended execution environment. For example, Java bytecode is translated into executable native code specific to a particular execution environment by a native compiler or interpreter, such as a Java virtual machine. Commonly, the generic code representation is compiled into native instructions, often implemented at run-time using a just-in-time compiler. However, compiling the generic code representation adds significant overhead. Also, compiling the generic code representation delays execution, such that a user perceives a relatively slow start up and lack of responsiveness. Alternatively, the generic code representation is interpreted, but similarly problems arise in that execution of generic code representation through an interpreter is significantly slower than execution of native code having similar functionality.

These problems arise particularly in relation to downloadable content such as web pages. U.S. Pat. No. 6,058,482 (Sun Microsystems) discloses a typical known method and apparatus wherein a web page includes a reference to a segment of generic code representation (e.g. a Java applet). A Java applet is translated locally at an execution apparatus prior to execution, leading to perceived slow start-up and response times.

SUMMARY OF INVENTION

An aim of the present invention is to provide a method and apparatus for obtaining translation of generic code representation. A preferred aim is to obtain translation wherein start-up speed and response times are improved.

According to a first aspect of the present invention there is provided a method for obtaining translation of generic code representation, the method for use at an execution apparatus, the method comprising the steps of: (a) determining a need for translation of generic code representation; (b) requesting a translation of the generic code representation from a remote translator apparatus; and (c) receiving a translated native code version of the generic code representation, from the translator apparatus.

Preferably, the translator apparatus is a remote translation server.

The generic code representation is obtained from any suitable source, but as one practical example the generic code representation is obtained as part of downloadable content from a content provider. As one example, the generic code representation is Java bytecode. Preferably the step (a) comprises determining a need for a translation of generic code representation that is supplied or referenced in relation to downloadable content provided from a content provider apparatus.

The execution apparatus suitably provides information identifying the generic code representation for which translation is desired, such as by providing a copy of all or part of a segment of code generic code representation or by providing a unique identifier associated with that segment of generic code representation, such as a URL.

When requesting a translation of the generic code representation, preferably information is provided about an intended execution environment. For example, an execution environment metric is provided to identify the nature of the execution environment of the execution apparatus.

The method preferably comprises receiving a translated native code version of the segment of generic code representation, the translated native code version being selected according to the execution environment provided by the execution apparatus. The translated native code version is executable at full native speed, thereby avoiding start-up delays (by avoiding a delay while the generic code representation is compiled, or a delay while an interpreter is initialised), and avoids execution overhead caused by interpretation of the generic code representation.

According to a second aspect of the present invention there is provided a method for obtaining translation of a segment of generic code representation, comprising the steps of: receiving downloadable content including or referencing a segment of generic code representation; determining a need for translation of the segment of generic code representation; requesting translation of the segment of generic code representation from a translator apparatus, including identifying the segment of generic code representation and specifying an execution environment; and receiving at an execution apparatus a translated native code version of the identified segment of generic code representation from the translator apparatus suitable for execution in the specified execution environment.

This aspect of the invention is particularly applicable to the situation where an execution apparatus receives downloadable content from a content provider apparatus, and obtains translation of a segment of generic code representation included or referenced in the downloadable content, by requesting a translated native code version from a translator apparatus. Suitably, the execution apparatus specifies an execution environment, such as by using an execution environment metric, and the translated native code version received from the translator apparatus is then executable as native code in that execution environment.

According to a third aspect of the present invention there is provided a method for providing translation of a segment of generic code representation, comprising the steps of: receiving a request for translation of a segment of generic code representation; selecting a translated native code version of the requested segment of generic code representation; and supplying the translated native code version for execution in an execution environment.

This aspect of the invention is particularly suitable for use at a translator apparatus which is arranged to communicate with an execution apparatus. Suitably a request for a translation is sent from the execution apparatus and is received by the translator apparatus. The request preferably includes information identifying the segment of generic code representation for which a translation is desired. Preferably, the request includes information specifying the execution environment on which the translated native code version will be executed, such as by way of an execution environment metric. The selecting step preferably comprises selecting a translated native code version of the identified segment of generic code representation appropriate for execution on the specified execution environment. Preferably, the selecting step comprises selecting the translated native code version from amongst a plurality of stored translated native code versions. Where, for example, the desired translated native code version is not available from amongst the plurality of stored translated native code versions, then optionally the method comprises obtaining the segment of generic code representation and translating the obtained segment of generic code representation to provide at least one translated native code version of the segment of generic code representation. The method preferably comprises storing the at least one translated native code version of the segment of generic code representation. Hence, the translator apparatus suitably builds up a library of translated native code versions of commonly requested segments of generic code representation, such that the appropriate translated native code version can be selected and sent to the execution apparatus for execution as native code in that execution environment.

Optionally, the method includes confirming that the selected translated native code version is current. Preferably, the method comprises comparing a time and date stamp associated with the segment of generic code representation desired for translation to a time and date stamp associated with the selected translated native code version. Suitably the method comprises selectively obtaining a current version of the segment of generic code representation and forming a new at least one translated native code version.

Optionally, the method includes searching for segments of generic code representation, translating any available segments of generic code representation to form one or more translated native code versions, and storing the or each translated native code version so as to be selectable in response to a request for translation.

According to a fourth aspect of the present invention there is provided an execution apparatus, comprising: an execution environment for performing computing operations in accordance with instructions native to the execution environment; and a controller operable to determine a need for translation of generic code representation, request translation of a segment of generic code representation from a translator apparatus, and receive a translated native code version of the segment of generic code representation for execution in the execution environment.

According to a fifth aspect of the present invention there is provided a translator apparatus, comprising: a translation store for storing one or more translated native code versions of one or more segments of generic code representation; and a translation unit arranged to receive a request for translation of a segment of generic code representation, select a translated native code version from the store, and supply the selected translated native code version to an execution apparatus for execution in an execution environment.

Preferably, the translation unit is arranged to obtain a segment of generic code representation in response to a received request, and to form one or more translated native code versions of the obtained segment of generic code representation.

According to a sixth aspect of the present invention there is provided a computing system comprising: a content provider apparatus arranged to provide downloadable content that includes or references a segment of generic code representation; an execution apparatus arranged to receive the downloadable content from the content provider apparatus, and to identify a need for translation of the generic code segment; and a remote translator apparatus arranged to store translations of the segment of generic code representation into one or more native code versions, and to supply a translated native code version of the segment of generic code representation to the execution apparatus, for execution natively on the execution apparatus.

In one particular preferred embodiment the present invention is implemented as computer software. Hence, the invention extends to a program storage medium that stores program code causing a general purpose computing device to operate as the execution apparatus defined herein, or as the translation apparatus defined herein. Also, the invention relates to an execution system and a translation system respectively, when stored on a computer readable medium.

BRIEF DESCRIPTION OF FIGURES

For a better understanding of the invention, and to show how embodiments of the same may be carried into effect, reference will now be made, by way of example, to the accompanying diagrammatic drawings in which.

DETAILED DESCRIPTION OF EMBODIMENTS

Figure 1:
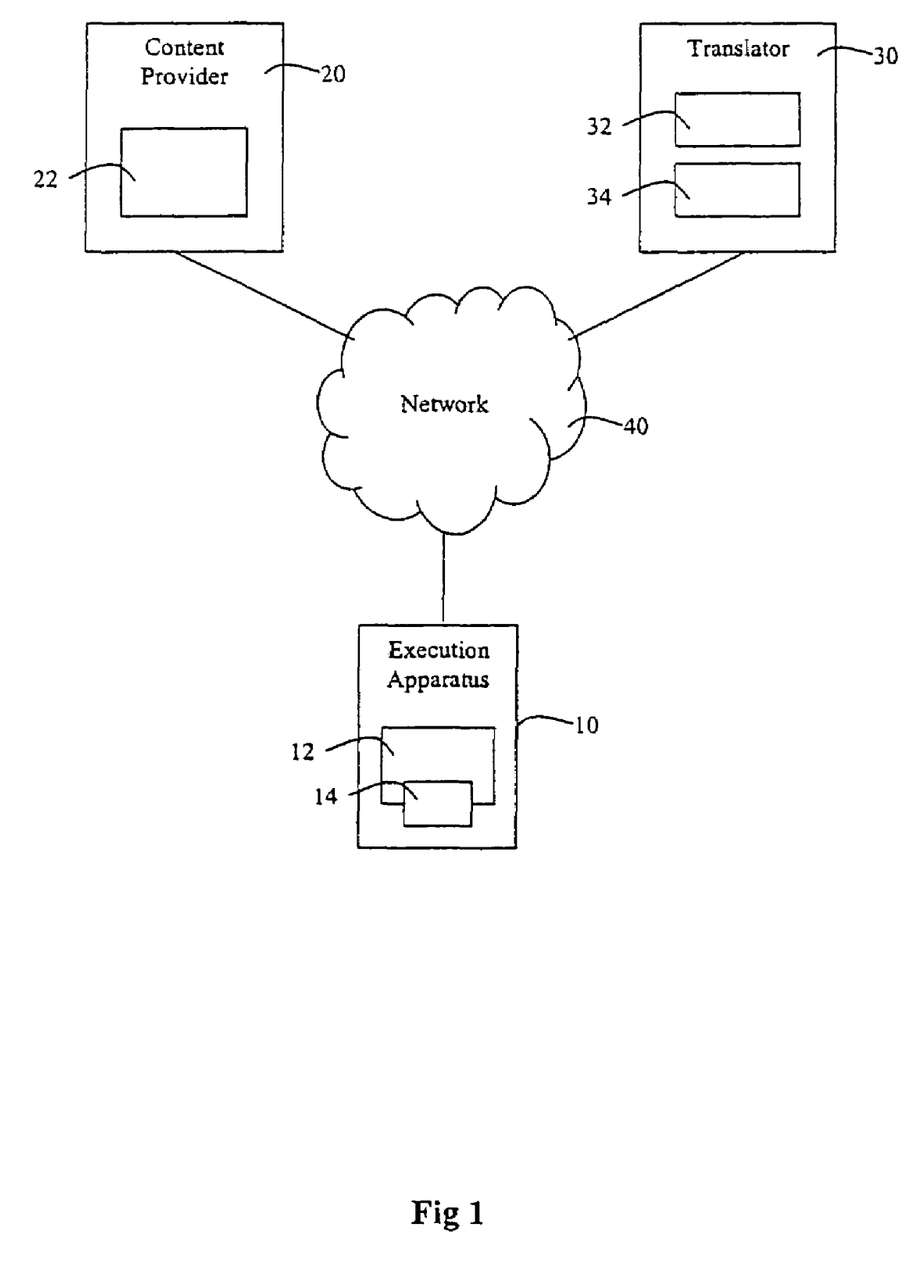
FIG. 1 is a schematic overview of a preferred computing system.

FIG. 1 shows an example computing system employed in a preferred embodiment of the present invention. An execution apparatus 10, a content provider apparatus 20 and a translator apparatus 30 are coupled through a network 40 such as a local intranet or global internet. The network 40 can take any suitable form, but typically comprises many intermediate servers and telecommunication connections.

The execution apparatus 10 provides an execution environment 12 for performing computing operations in accordance with instructions native to the execution environment 12. Performance of computing operations in the execution environment 12 is controlled by a controller 14. The execution apparatus 10 can take any suitable form. In one example the execution apparatus 10 is a general purpose device such as a desktop computer, a laptop computer, a palmtop computer or a personal digital assistant. In another example the execution apparatus 10 is adapted to perform a specific function such as a music player (e.g. an MP3 player) or an audio visual player. In yet another example the execution apparatus is a dedicated web access device such as a web TV.

The content provider apparatus 20 can take any suitable form including, for example, a remote server having a processing unit, storage for data and programs, and network connections. The content provider apparatus 20 stores downloadable content in a store 22.

It is desired to obtain downloadable content from the remote content provider apparatus 20 across the network 40 for execution on the execution apparatus 10. Conveniently, the downloadable content is provided wholly or at least in part in a generic code representation. The advantages of generic code representation are well appreciated. In particular, a content author need only write one version of their content, which is stored on the content provider apparatus. The content provider apparatus 20 need only supply or reference one version of the generic code representation which is executable by all types of execution apparatus, following a suitable translation into native instructions appropriate to the specific execution environment 12 provided by the execution apparatus 10.

In one specific example situation, the execution apparatus 10 downloads content from the content provider 20 in the form of a web page written in a standard language such as HTML, although many other standard languages are available. Typically, the execution apparatus 10 comprises a web browser forming part of the execution environment 12 which requests a desired web page from a website corresponding to the content provider apparatus 20 and receives a page of HTML in return. The user browser 10 resolves the HTML page which includes a segment of generic code representation, or includes a reference to a segment of generic code representation (hereafter termed a generic code segment). For example, the HTML web page includes a reference to a Java applet. The generic code segment is stored at any convenient location, on the content provider apparatus or elsewhere. There are many specific options for referencing a stored generic code segment, as will be familiar to the skilled person.

It is desired to obtain a translation of the generic code segment, whilst avoiding problems of slow start-up and response times associated with prior art translation methods and apparatus. To this end, the preferred embodiment of the present invention includes a translator apparatus 30.

The translator apparatus 30 includes a translation unit 32 and a translation store 34. The translation unit 32 receives generic code representation and produces a translation into native code specific to a particular execution environment. Preferably, the translation unit receives a generic code segment and is capable of producing many versions of the translated native code each specific to a particular execution environment. The translation store 34 stores the translated native code version or in cases where more than one translated native code version is produced, each translated native code portion is stored in the translation store. Suitably, the translator apparatus 30 is remote from the execution apparatus 10, preferably both physically and logically. Also, the translator apparatus 30 is preferably remote from the content provider apparatus 20. The translator apparatus 30 is suitably a remote server.

Figure 2:
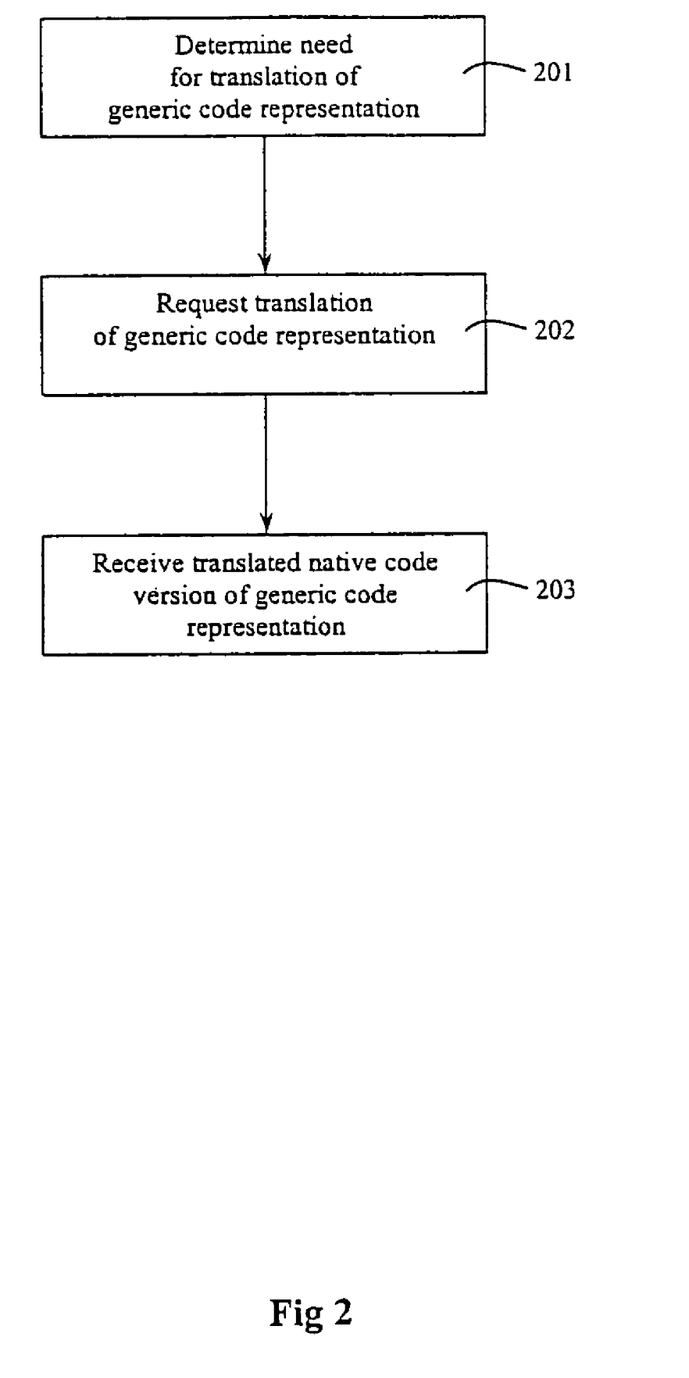
FIG. 2 shows a preferred method for obtaining translation of generic code representation.

A preferred method for obtaining translation of generic code representation will now be described with reference to FIG. 2.

In step 201, the need for a translation of generic code representation is determined. Preferably, the execution apparatus 10 determines the need for translation of generic code representation. Preferably, the execution apparatus 10 determines the need for translation of a generic code segment supplied or referenced in relation to downloadable content from the content provider apparatus 20.

In step 202, a translation of the generic code representation is requested. Preferably, the execution apparatus 10 requests a translation of the generic code representation from the translator apparatus 30. Preferably, the request includes supplying information about the execution environment 12 provided by the execution apparatus 10. For example, the execution apparatus 10 provides information about a processor type, an operating system type and version, and a web browser type and version, or any other suitable characteristic of the execution environment 12. Preferably, characteristics of the execution environment 12 are combined to form an execution environment metric giving information about the execution environment in a specified form. Preferably, the execution environment metric is unique to the execution environment or to a group of like execution environments all capable of executing a particular translated native code version of the generic code representation.

Preferably, in the step 202 a generic code segment is identified for which translation is desired. In a first simple example, a generic code segment is received by the execution apparatus 10 and sent to the translator apparatus 30 for translation. In a second more advanced example, in the step 202 the execution apparatus 10 provides information identifying a generic code segment for which a translation is desired. This information is suitably a unique identifier reference for the desired generic code segment.

In step 203, a translated native code version of the generic code representation is provided. Preferably, a translated native code version of the generic code representation is sent from the translator apparatus 30 and is received by the execution apparatus 10. Preferably, the translator apparatus 30 selects one translated native code version amongst many stored versions. Preferably, the translator apparatus 30 selects a translated native code version according to information about the intended execution environment such as the execution environment metric provided by the execution apparatus 10, and according to the information identifying the generic code segment for which translation is desired. Preferably, the translation apparatus 30 uses the unique identifier reference to select the group of translated code versions corresponding to the generic code segment of interest, and selects the appropriate one amongst the versions according to the execution environment metric.

Figure 3:
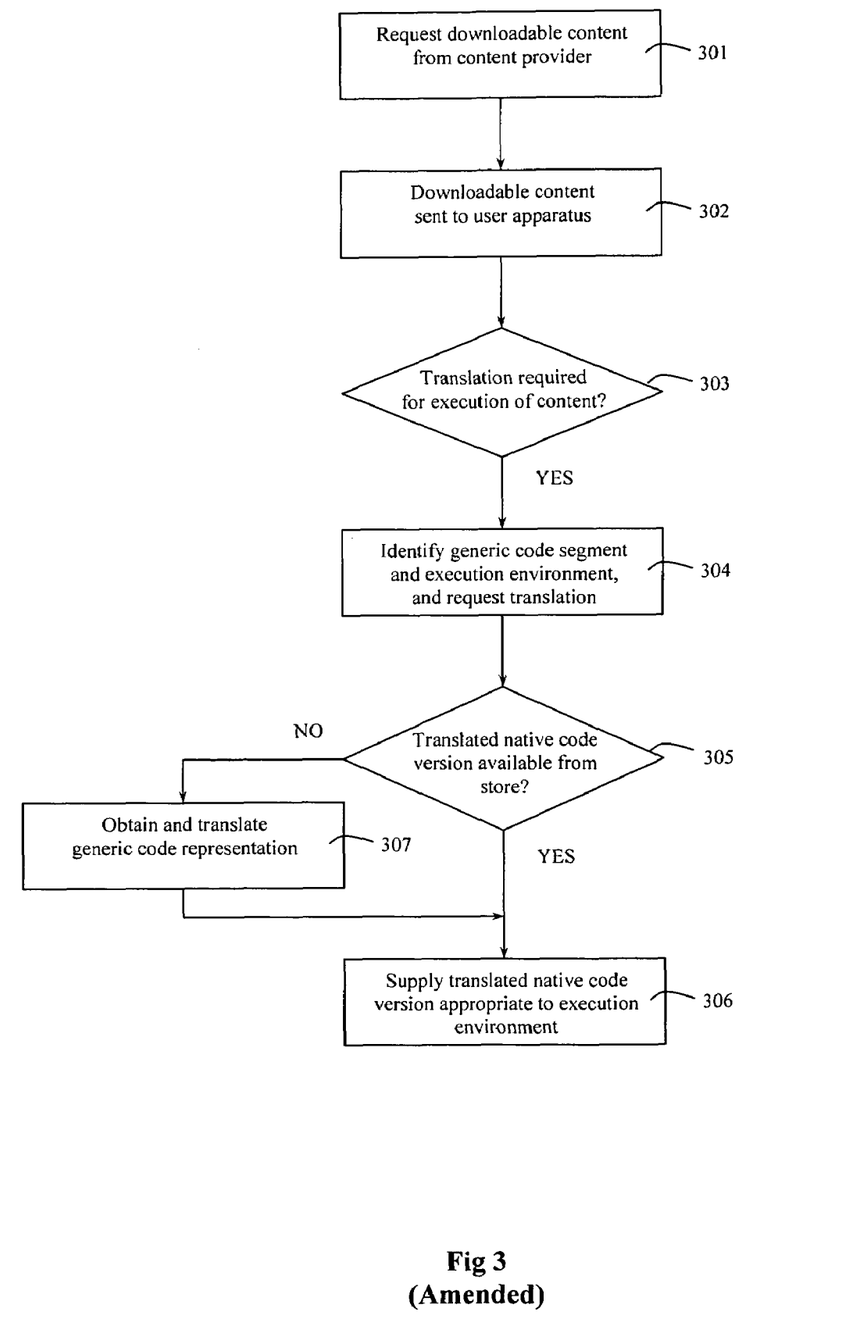
FIG. 3 shows a preferred method for obtaining translation of generic code representation for downloadable content.

Referring to FIG. 3, a preferred method for obtaining translation of generic code representation will now be described to illustrate one practical application of the present invention. In this example it is desired to download a HTML web page from a website provided by the content provider apparatus 20 to the execution apparatus 10, where the HTML web page contains a reference to a Java applet.

In step 301, the execution apparatus 10 requests the desired web page from the content provider website.

In step 302, a page of HTML is returned to the execution apparatus 10.

In step 303, the execution apparatus 10 attempts to render the page of HTML for display, and discovers that the page contains a reference to a Java applet. Hence, the execution apparatus 10 determines the need for translation of generic code representation, even though the generic code segment (Java applet) has not yet been downloaded to the execution apparatus.

In step 304, the execution apparatus 10 requests a translation of the referenced Java applet from the translation apparatus 30.

Preferably, the execution apparatus 10 provides information about the referenced Java applet, such as a URL (Unique Resource Locator) giving, the location where the Java applet is stored. Conveniently, the URL is unique to the desired Java applet. Also, the execution apparatus 10 provides information about the execution environment 12, preferably in the form of an execution environment metric.

In step 305, the translator apparatus 30 searches the translation store 34 for a stored translated native code version which matches the identified applet and the identified execution environment.

At step 306, if available from the translation store 34 a matching translated native code version is sent from the translator apparatus 30 to the execution apparatus 10 for execution in the execution environment 12. Suitably, the execution apparatus receives the translated native code version of the referenced Java applet and completes rendering of the HTML web page for display. The native code version runs faster than the equivalent generic code representation, because translation at the execution apparatus is avoided.

Optionally, at step 307, if the search for a match fails then the translator apparatus 30 obtains the referenced Java applet. The applet might be stored on the translation apparatus as the result of a previous translation, or might be retrieved from the content provider apparatus 20 or any other suitable location such as by following the URL. The translation unit 32 translates the generic code representation of the applet to produce a translated native code version specific to the identified execution environment of the execution apparatus 10. That is, the identified applet is retrieved from a suitable source and translated to a translated native code version appropriate to the identified execution environment. Preferably, the new translated version is added to the translation store 34.

Preferably, the step 306 includes identifying a potentially matching translated native code version in the translation store, and confirming that the potential match is still current. Suitably, the information about the desired generic code representation supplied from the execution apparatus includes a date and time stamp. If the stored translated native code version is found to be out of date, then an updated copy of the generic code representation is obtained as in step 307. The previously stored version can be discarded, or kept so as to support both old and new versions of the generic code segment.

Optionally, in step 307 the translator apparatus actively searches for generic code representation such as Java applets in response to user commands or in a semi-automated fashion such as by using a search engine. The translator apparatus builds up a library of commonly referenced applets and commonly required translation versions. Preferably, each time a translation is performed the translator apparatus 30 translates each obtained generic code representation into many translated native code versions appropriate to commonly preferred execution environments. Suitably, the preferred execution environments are those which are most commonly used by available execution apparatus.

Other modifications and changes will be apparent to the skilled person when making specific implementations of the present invention, beyond the scope of the specific examples given above. For example, it is known that some Java applets change their behaviour, augmenting or replacing certain classes by invoking the Java class loader. Suitably, the execution apparatus requests a modified translated version of the Java applet from the translator apparatus in response to dynamic behaviour of the original translated native code version. Other example adaptations and implementations of the present invention will be apparent to the skilled person.

A method and apparatus have been described allowing a translation of generic code representation to be obtained in a manner which avoids slow start up and poor execution responsive at the execution apparatus. Advantageously, a content provider can still provide downloadable content using generic code representation such as Java applets, which provides excellent compatibility with currently available downloadable content, and allows downloadable content to be created using existing tools and procedures. In practice, many execution apparatus are the same such that execution environments fall into relatively few identified types and therefore, a matching translated version of generic code representation such as a Java applet is quite likely to be available from the translator apparatus in any particular instance. The execution apparatus receives a translated native code version of generic code representation which is executable on the execution environment at full native speed. In most practical examples, downloading the translated native code version takes a similar length of time compared to downloading generic code representation. However, a significant start up speed and response time advantage is gained because the translated native code version runs on the execution environment at full native speed, whereas a downloaded generic code representation requires translation prior to execution.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A method for obtaining translation of generic code representation, which is independent of an intended execution environment, into executable native code which is executable in an execution environment provided by an execution apparatus, the method comprising the steps of:
   (a) receiving at the execution apparatus the generic code representation across a wide network area from a content provider apparatus and determining at the execution apparatus a need for translation of the generic code representation;
   (b) sending a request from the execution apparatus to a translator apparatus across a wide area network, requesting a translation of the generic code representation, the translator apparatus remote across the wide area network from both the execution apparatus and the content provider apparatus; and
   (c) receiving from the translator apparatus a translated native code version of the generic code representation for execution in the execution environment of the execution apparatus.

2. The method of claim 1, wherein the generic code representation is supplied or referenced in relation to downloadable content from the content provider apparatus.

3. The method of claim 1, wherein the step (b) comprises providing information about an execution environment of the execution apparatus.

4. The method of claim 3, wherein the step (b) comprises providing an execution environment metric.

5. The method of claim 1, wherein the step (b) comprises providing information identifying the generic code representation for which translation is desired.

6. The method of claim 5, wherein the step (b) comprises identifying a segment of generic code representation.

7. The method of claim 6, wherein the step (b) comprises providing a unique resource locator identifier associated with the segment of generic code representation.

8. The method of claim 1, wherein the step (c) comprises receiving the translated native code version which has been selected according to the execution environment provided by the execution apparatus.

9. A method for obtaining translation of a segment of generic code representation, which is independent of an intended execution environment, into executable native code for the execution environment provided by an execution apparatus comprising the steps of:
   receiving downloadable content at the execution apparatus from a content provider across a wide area network, the downloadable content including or referencing a segment of generic code representation;

determining a need for translation of the segment of generic code representation;

requesting across a wide area network a translation of the segment of generic code representation from a translator apparatus remote across the wide area network from both the execution apparatus and the content provider apparatus, for a translation of the segment of generic code representation, including identifying the segment of generic code representation and specifying the execution environment provided by the execution apparatus; and receiving at the execution apparatus a translated native code version of the identified segment of generic code representation from the translator apparatus, suitable for execution in the specified execution environment.

10. The method of claim 9, comprising sending all or part of the segment of generic code representation to the remote translator apparatus.

11. The method of claim 9, comprising sending a unique resource locator reference for the segment of generic code representation to the translator apparatus.

12. The method of claim 9, comprising sending an execution environment metric to the translator apparatus.

13. A method for providing a translation of a segment of generic code representation supplied or referenced in relation to downloadable content provided from a content provider apparatus to an execution apparatus, the generic code representation being independent of an intended execution environment, into executable native code which is executable natively in an execution environment provided by the execution apparatus, the execution apparatus coupled to the content provider apparatus over a wide area network, the method comprising the steps of:

receiving at a translator apparatus a request for translation of a segment of generic code representation, the translator apparatus remote across a wide area network from the content provider apparatus and the execution apparatus, such that the request for translation is received across the wide area network;

selecting a translated native code version of the requested segment of generic code representation; and supplying the translated native code version across the wide area network for execution in the execution environment of the execution apparatus.

14. The method of claim 13, wherein the received request includes information identifying the segment of generic code representation for which a translation is desired.

15. The method claim 13, wherein the received request includes information identifying the execution environment, and the selecting step comprises selecting a translated native code version of the segment of generic code representation appropriate for execution on the identified execution environment.

16. The method of claim 13, wherein the selecting step comprises selecting the translated native code version from amongst a plurality of stored translated native code versions.

17. The method of claim 13, comprising obtaining the segment of generic code representation and translating the obtained segment of generic code representation to provide at least one translated native code version of the segment of generic code representation.

18. The method of claim 17, comprising storing the at least one translated native code version of the segment of generic code representation.

19. The method of claim 13, comprising confirming that the selected translated native code version is current.

20. The method of claim 19, comprising comparing a time and date stamp associated with the segment of generic code representation desired for translation to a time and date stamp associated with the selected translated native code version.

21. The method of claim 19, comprising selectively obtaining a current version of the segment of generic code representation and forming a new at least one translated native code version.

22. The method of claim 13, comprising searching for segments of generic code representation, translating any available segments of generic code representation to form one or more translated native code versions, and storing each of the one or more translated native code versions so as to be selectable in response to a request for translation.

23. An execution apparatus, comprising:

an execution environment for performing computing operations in accordance with instructions native to the execution environment; and a controller operable to determine a need for translation of generic code representation, request translation of a segment of generic code representation from a translator apparatus, and receive a translated native code version of the segment of generic code representation for execution in the execution environment, by steps of:

(a) receiving the generic code representation from a content provider apparatus across a wide area network and determining that a generic code representation requires translation into executable native code;

(b) sending a request from the execution apparatus to the translator apparatus across a wide area network, requesting a translation of the generic code representation, the translator apparatus remote across the wide area network from both the execution apparatus and the content provider apparatus; and (c) receiving from the remote translator apparatus a translated apparatus a translated executable native code version of the generic code representation for execution in the execution environment of the execution apparatus.

24. The execution apparatus of claim 23, wherein the controller is arranged to form an execution environment metric identifying characteristics of the execution environment, to be supplied as part of the request for translation.

25. A translator apparatus, comprising:

a translation store for storing one or more translated native code versions of one or more segments of generic code representation; and a translation unit arranged to receive a request for translation of a segment of generic code representation supplied or referenced in relation to downloadable content provided from a content provider apparatus to an execution apparatus, the execution apparatus coupled to the translator apparatus over a wide area network, and the content provider apparatus coupled to the translator apparatus over a wide area network, wherein the generic code representation is independent of an intended execution environment and the request for translation is a request for translation into executable native code which is natively executable in an execution environment provided by the execution apparatus, the execution apparatus coupled to the content provider apparatus the wide area network, the translator unit arranged to perform the steps of:

receiving from the execution apparatus across a wide area network a request for translation of a segment of generic code representation;

selecting a translated native code version of the requested segment of generic code representation; and supplying the translated native code version across the wide area network for execution in the execution environment of the execution apparatus.

26. The translator apparatus of claim 25, wherein the translation unit is arranged to obtain a segment of generic code representation in response to a received request, and to form one or more translated native code versions of the obtained segment of generic code representation.

27. A computing system, comprising:
a wide area network;
a content provider apparatus arranged to provide downloadable content that includes or references a segment of generic code representation across the wide area network, where the segment of generic code representation is independent of an intended execution environment;
an execution apparatus arranged to receive the downloadable content from the content provider apparatus across the wide area network, and in response send a request across the wide area network for translation of the generic code segment into executable native code, which is natively executable in an execution environment provided by the execution apparatus; and
a translator apparatus remote across the wide area network from both the execution apparatus and the content provider apparatus, arranged to store translations of the segment of generic code representation into one or more native code versions, and to supply a translated native code version of the segment of generic code representation across the wide area network to the execution apparatus in response to the request from the execution apparatus.

* * * * *